US006648636B2

(12) United States Patent
Kanematsu et al.

(10) Patent No.: US 6,648,636 B2
(45) Date of Patent: Nov. 18, 2003

(54) HEATING DEVICE FOR HEAT-SEALING CONTAINERS

(75) Inventors: Toshio Kanematsu, Tokushima (JP); Takahiro Miyawaki, Tokushima (JP); Yoshihiro Saijo, Tokushima (JP); Michio Ueda, Tokushima (JP)

(73) Assignee: Shikoku Kakoki Co., LTD, Tokushima (JP)

(*) Notice: Subject to any disclaimer, the term of this patent is extended or adjusted under 35 U.S.C. 154(b) by 0 days.

(21) Appl. No.: 10/369,102

(22) Filed: Feb. 20, 2003

(65) Prior Publication Data

US 2003/0175648 A1 Sep. 18, 2003

(30) Foreign Application Priority Data

Feb. 20, 2002 (JP) ......................................... 2002-042557

(51) Int. Cl.[7] ............................................... B65B 51/20
(52) U.S. Cl. ........................... 432/224; 53/477; 493/133
(58) Field of Search ............................. 432/224–225; 53/477; 493/133, 189, 207

(56) References Cited

U.S. PATENT DOCUMENTS 5,230,204 A * 7/1993 Hall et al. .................... 53/477
5,618,253 A * 4/1997 Okushita .................... 493/134
5,678,391 A * 10/1997 Andersen et al. ............. 53/477
5,868,567 A * 2/1999 Abe et al. .................... 432/224

* cited by examiner

Primary Examiner—Gregory A. Wilson
(74) Attorney, Agent, or Firm—Armstrong, Westerman & Hattori, LLP

(57) ABSTRACT

A heating device for heat-sealing containers by heating an end forming portion 13 of a tubular container having a rectangular to square cross section, the end forming portion 13 having four generally quadrilateral first to fourth panels 21 to 24 continuous with one another and each having a heating region 31, 32, 33 or 34 to be heated on an inner surface thereof. The heating device has a hot air nozzle 71 in the form of a bottomed tube and fittable into the container end forming portion 13 for heating an inner surface of the container. The nozzle 71 has four side walls 81 to 84 continuous with one another and corresponding to the first to fourth panels 21 to 24 respectively, at least one of the side walls 81 to 84 being provided with a hot air discharge portion 121, 122, 123 or 124 having orifices 111 and to be opposed to the heating region of the corresponding panel 21, 22, 23 or 24 and with a hot air nondischarge portion 125, 126, 127 or 128 other than the discharge portion, the hot air nondischarge portion being at least partly provided with a hot air escape portion 95, 96, 97 or 98.

12 Claims, 17 Drawing Sheets

HEATING DEVICE FOR HEAT-SEALING CONTAINERS

BACKGROUND OF THE INVENTION

The present invention relates to heating devices for heat-sealing containers for use in folding end portions of tubular blanks having a square or rectangular cross section to a flat form which end portions are to be made into bottom portions or top portions of containers and heat-sealing the folded end portions.

Already known as such a device is a heating device for heating a bottom forming portion of a tubular container having a rectangular to square cross section, the bottom forming portion having four generally quadrilateral first to fourth bottom panels continuous with one another and each having a heating region to be heated on the inner surface thereof. The heating device has a hot air nozzle in the form of a bottomed tube and fittable into the container bottom forming portion for heating the inner surface of the container, the nozzle having four side walls continuous with one another and corresponding to the first to fourth bottom panels respectively, each of the side walls being provided with a hot air discharge portion having orifices and to be opposed to the heating region of the corresponding bottom panel and with a hot air nondischarge portion other than the discharge portion, the entire hot air discharge and nondischarge portions of each side wall being holdable at a specified spacing from the corresponding bottom panel. (See JP-A 11-240083).

The conventional device is adapted to heat the inner surface of each bottom panel concentrically over the heating region with hot air forced out from the orifices of the nozzle as opposed to the region. Although there arises no problem if only the heating region is heated, it is likely that the nonheating region other than the heating region will be heated, presumably for the following two reasons. First, the hot air forced out of the orifices is brought into contact not only with the heating region but also with the nonheating region adjacent thereto, permitting the nonheating region to become heated. Second, the hot air forced out of the orifices of the hot air discharge portion of the nozzle for the heating region will heat the hot air nondischarge portion having no orifices, with the result that the nonheating region becomes heated with the heat radiating from the heated nondischarge portion.

If the region which need not be heated is heated, this entails the possibility of causing damage to the packaging material. Since the bottom portion of the container is in contact with the liquid contents at all times especially during transport, the damage caused to the packaging material will result in faults such as a leak of contents.

SUMMARY OF THE INVENTION

An object of the present invention is to provide a heating device for heat-sealing containers which is useful for heat-sealing end portions of containers and which is adapted to concentrically heat required portions only of a packaging material to be made into the container.

The present invention provides a heating device for heat-sealing containers by heating an end forming portion of a tubular container having a rectangular to square cross section, the end forming portion having four generally quadrilateral first to fourth panels continuous with one another and each having a heating region to be heated on an inner surface thereof, the heating device having a hot air nozzle in the form of a bottomed tube and fittable into the container end forming portion for heating an inner surface of the container, the nozzle having four side walls continuous with one another and corresponding to the first to fourth panels respectively, at least one of the side walls being provided with a hot air discharge portion having orifices and to be opposed to the heating region of the corresponding panel and with a hot air nondischarge portion other than the discharge portion, the hot air nondischarge portion being at least partly provided with a hot air escape portion.

With the heating device of the invention, the hot air nondischarge portion, as positioned inside the panels, is at least partly provided with the hot air escape portion, so that hot air forced out from the hot air discharge portion flows through the hot air escape portion and is rapidly discharged from a space between the nondischarge portion and the panel opposed thereto. This eliminates the likelihood that the portion other than the heating region will be unnecessarily heated. Furthermore, even if the hot air nondischarge portion is heated with the hot air forced out from the discharge portion, the escape portion reduces the influence of the heat radiating from the heated nondischarge portion. Accordingly, the portion of the panel other than the heating region will not be heated but the heating region only can be heated concentrically.

If the hot air discharge portion and the hot air nondischarge portion are divided into upper and lower portions by a boundary, with the hot air escape portion provided over the entire area of the nondischarge portion, the heating region only can be heated more efficiently.

When the boundary is substantially inverted V-shaped by extending upward from opposite ends of a lower edge of the side wall, the hot air can be discharged efficiently through the hot air nondischarge portion.

The present invention provides another heating device for heat-sealing containers by heating an end forming portion of a tubular container having a rectangular to square cross section, the end forming portion having four generally quadrilateral first to fourth panels continuous with one another and each having a heating region to be heated on an outer surface thereof, the heating device having a hot air nozzle to be fitted around the container end forming portion for heating an outer surface of the container, the nozzle having four side walls continuous with one another and corresponding to the first to fourth panels respectively, at least one of the side walls being provided with a hot air discharge portion having orifices and to be opposed to the heating region of the corresponding panel and with a hot air nondischarge portion other than the discharge portion, the hot air nondischarge portion being at least partly provided with a hot air escape portion.

The heating device described above and embodying the invention is adapted to heat the outer surfaces of the panels in the same manner as the inner surfaces thereof without heating the portions other than the heating regions of the panels, thus heating the heating regions only concentrically.

The hot air discharge portion and the hot air nondischarge portion are divided into upper and lower portions by a substantially horizontal straight boundary interconnecting lengthwise intermediate portions of opposite side edges of the side wall, and the hot air escape portion is provided over the entire area of the nondischarge portion. The heating region can then be heated concentrically more effectively with the hot air forced out from the discharge portion.

The heating region provided on the outer surface of at least one of the four panels is zero, and the side wall corresponding to said one panel is provided with the hot air nondischarge portion only, the hot air escape portion being provided over the entire area of the nondischarge portion. The panel wherein the heating region is zero is then in no way heated, while the hot air forced out from other side walls can be rapidly discharged from between the panel and the side wall via the escape portion.

When the hot air nozzle is suspended from a mount plate, with a hot air vent clearance formed between-the mount plate and at least one peripheral portion of the hot air nozzle, hot air is unlikely remain between the container inner surface heating nozzle and the container outer surface heating nozzle undesirably. The heating region can then be concentrically heated more effectively.

The present invention provides another heating device for heat-sealing containers by heating a top forming portion of a tubular container having a rectangular to square cross section, the top forming portion having four generally quadrilateral first to fourth top panels continuous with one another and divided by first to fourth scores into first to fourth roof panels and first to fourth seal panels respectively, each of the first and fourth seal panels having a heating region to be heated on an outer surface thereof, the heating device having a hot air nozzle in the form of a bottomed tube and fittable into the container top forming portion for heating an inner surface of the container, the nozzle having four side walls continuous with one another and corresponding to the first to fourth seal panels respectively, at least one of the side walls being provided with a hot air discharge portion having orifices and to be opposed to the heating region of the corresponding seal panel and with a hot air nondischarge portion other than the discharge portion, the hot air nondischarge portion being at least partly provided with a hot air escape portion.

With the heating device of the invention described, the hot air nondischarge portion, as positioned inside the seal panels, is at least partly provided with the hot air escape portion, so that hot air forced out from the hot air discharge portion flows through the hot air escape portion and is rapidly discharged from a space between the nondischarge portion and the panel opposed thereto. This eliminates the likelihood that the portion other than the heating region will be unnecessarily heated. Furthermore, even if the hot air nondischarge portion is heated with the hot air forced out from the discharge portion, the escape portion reduces the influence of the heat radiating from the heated nondischarge portion. Accordingly, the portion of the seal panel other than the heating region will not be heated but the heating region only can be heated concentrically.

The nozzle has a bottom wall, and the hot air escape portion is a recessed portion extending from the side wall of the nozzle to the bottom wall. This prevents the froth produced when the container is filled with contents from adhering to the bottom wall. This obviates the likelihood that the froth, if adhering to the bottom wall, will clog up the nozzle.

When two hot air discharge portions are positioned respectively on opposite sides of one hot air nondischarge portion, with the hot air escape portion provided over the entire area of the nondischarge portion, the heating region only can be heated more efficiently.

When a hot air nozzle to be fitted around the container top forming portion is suspended from a mount plate for heating an outer surface of the container, with a hot air vent clearance formed between the mount plate and the hot air nozzle for heating the container outer surface, hot air is unlikely to remain between this nozzle and the container inner surface heating nozzle. This assures concentric heating of the heating region with an improved efficiency.

DESCRIPTION OF THE PREFERRED EMBODIMENTS

Embodiments of the invention will be described below with reference to the drawings.

Container Bottom Heating Device

Figure 7:
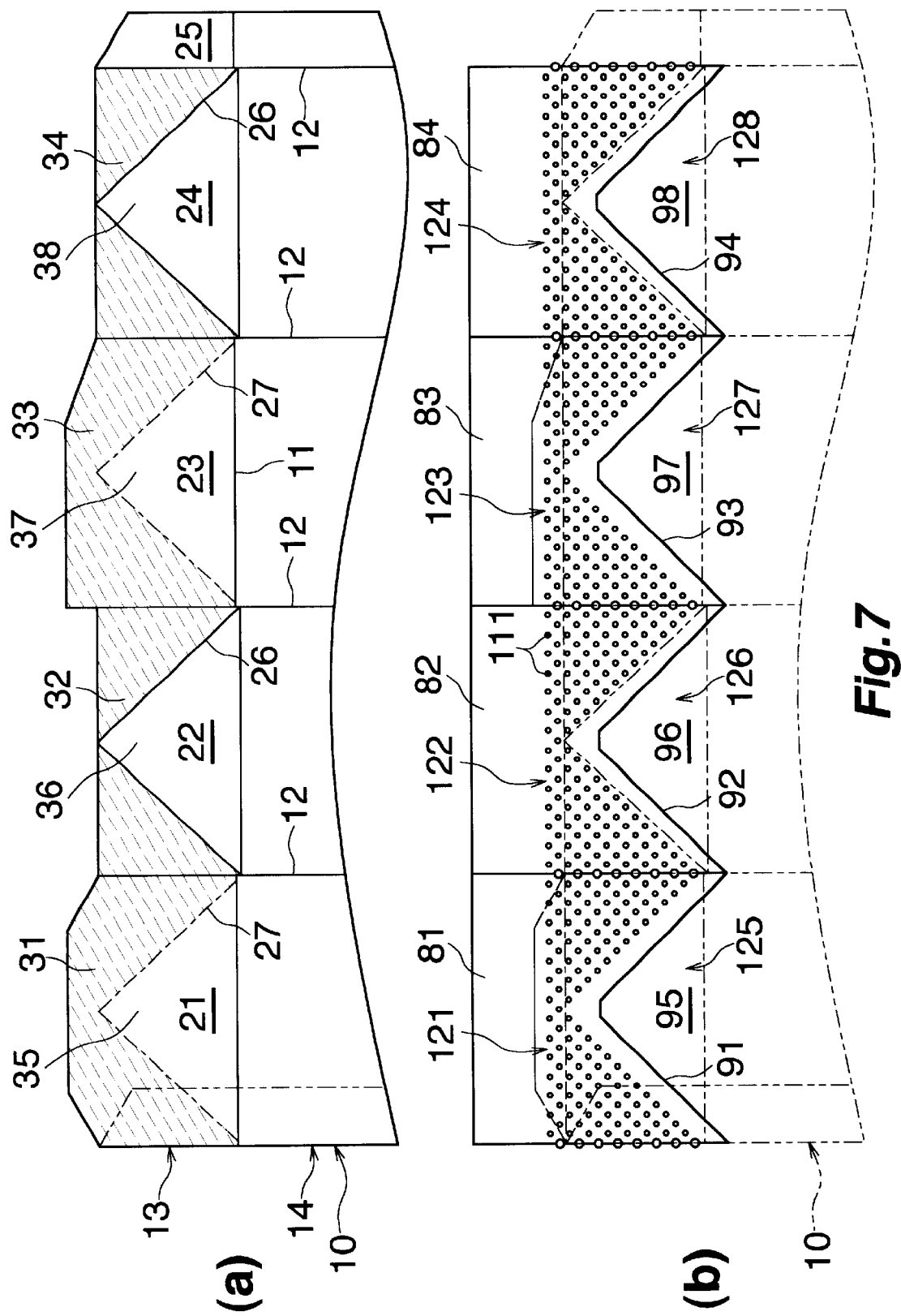
FIG. 7 includes developments of the inner surface of a container bottom forming portion and the container inner surface heating nozzle.
Figure 8:
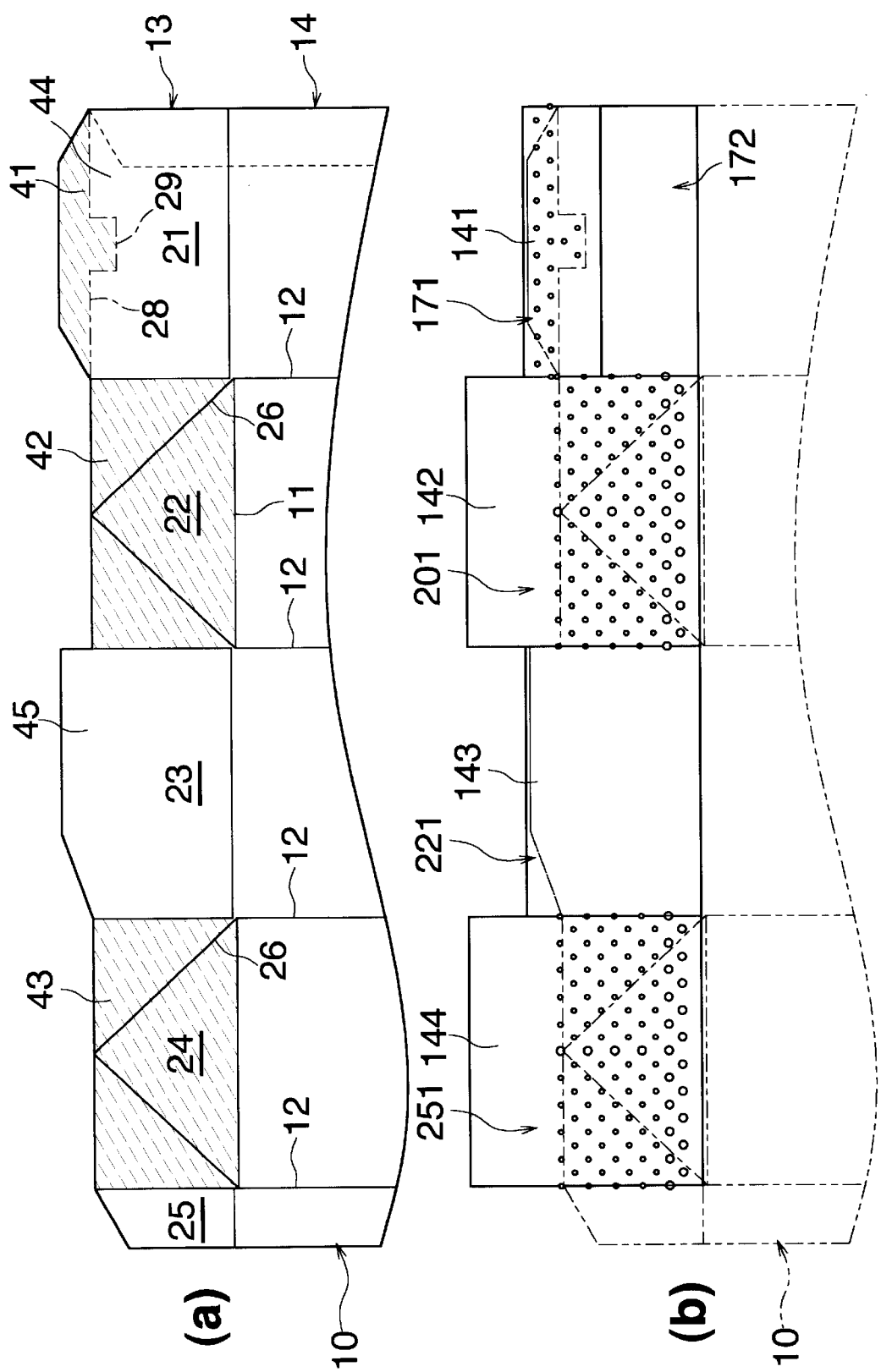
FIG. 8 includes developments of the outer surface of a container bottom forming portion and the container outer surface heating nozzle.

FIG. 7(a) is a development of a blank as it is seen from inside, and FIG. 8(a) is a development of the blank as it is seen from outside.

With reference to FIG. 7(a), the blank has a horizontal score 11 and four vertical scores 12 intersecting the score 11.

The portion above the horizontal score 11 provides a bottom forming portion 13, and the portion below the score serves as a trunk forming portion 14.

The bottom forming portion 13 comprises panels divided by the vertical scores 12, i.e., generally rectangular first to fourth four bottom panels 21 to 24 arranged from left rightward and continuous with one another, and a striplike fifth bottom panel 25 integral with the right edge of the fourth bottom panel 24. The bottom forming portion is formed into a tube of square cross section in advance by sealing the entire outer surface of the fifth bottom panel 25 to the inner surface of a left edge portion of the first bottom panel 21.

The second bottom panel 22 and the fourth bottom panel 24 are each provided with an inverted V-shaped score 26. The first bottom panel 21 and the third bottom panel 23 are each provided with an inverted V-shaped phantom line 27 identical with the inverted V-shaped score 26 in shape.

With reference to FIG. 8(a), a horizontal score 11, vertical scores 12 and inverted V-shaped scores 26 are formed in the outer surface of the blank in alignment respectively with the horizontal score 11, vertical scores 12 and inverted V-shaped scores 26 shown in FIG. 7(a) and formed in the inner blank surface. The first bottom panel 21 is provided with a horizontal straight phantom line 28 which appears like a rightward extension of the upper edge of the second bottom panel 22. A generally U-shaped downward bent line 29 is formed in the lengthwise midportion of the line 28.

The inner surface of the bottom forming portion 13 has a portion upwardly of the inverted V-shaped phantom line 27 in the first bottom panel 21, i.e., a first heating region 31, a portion upwardly of the inverted V-shaped score 26 in the second bottom panel 22, i.e., a second heating region 32, a portion upwardly of the inverted V-shaped phantom line 27 in the third bottom panel 23, i.e., a third heating region 33, and a portion upwardly of the inverted V-shaped score 26 in the fourth bottom panel 24, i.e., a fourth heating region 34. The bottom panels 21 to 24 have portions other than these heating regions 31 to 34, i.e., nonheating regions 35 to 38, respectively. The heating regions 31 to 34 are shown as hatched.

The outer surface of the bottom forming portion 13 has a portion upwardly of the horizontal straight phantom line 27 in the first bottom panel 21, i.e., a first heating region 41, and second and third heating regions 42, 43 provided respectively by the entire second bottom panel 22 and the entire fourth bottom panel 24. The first bottom panel 21 has a first nonheating region 44 downwardly of the first heating region 41. The third bottom panel 23 provides in its entirety a second nonheating region 45.

Figure 1:
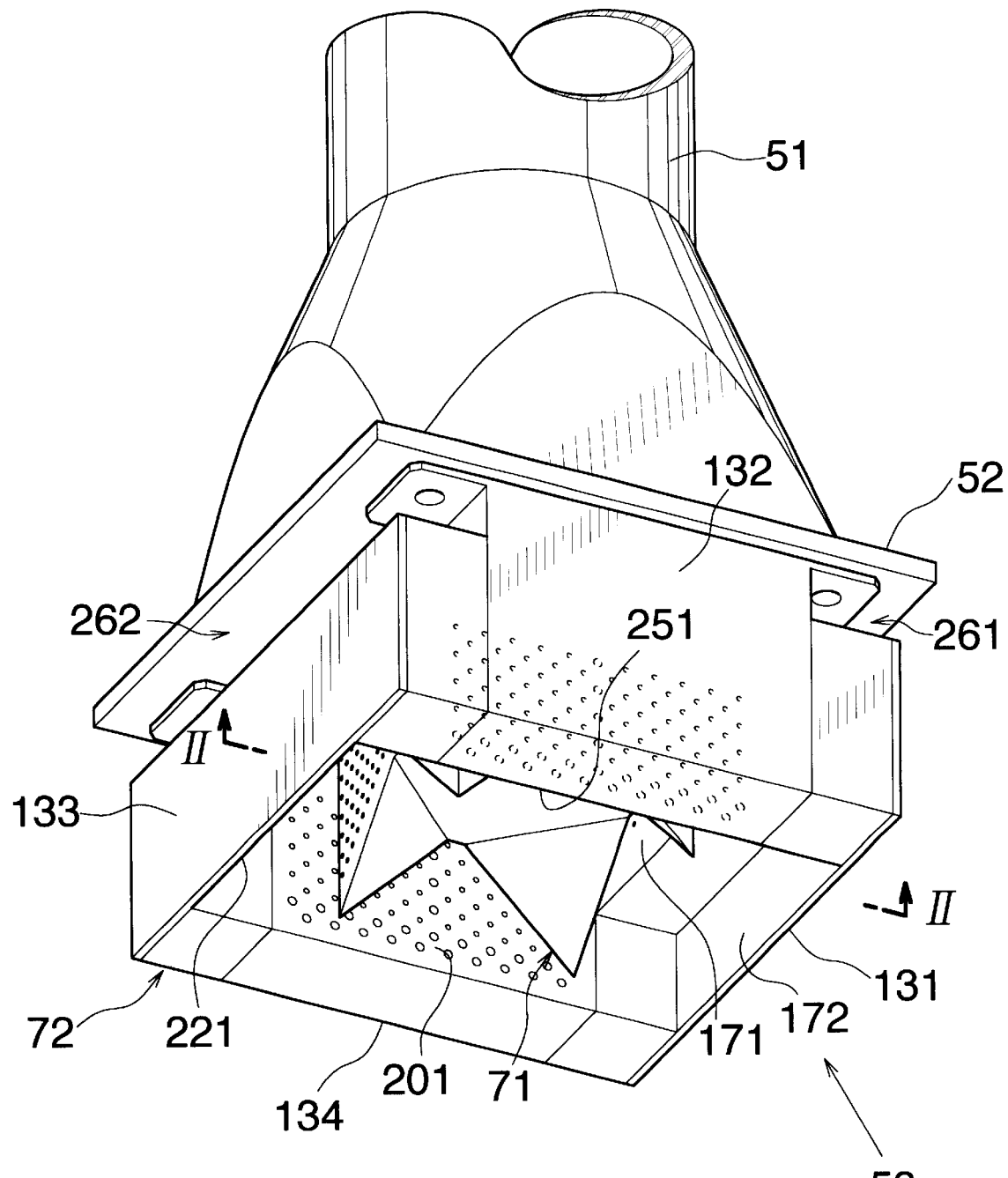
FIG. 1 is a perspective view of a container bottom heating device according to the invention.
Figure 2:
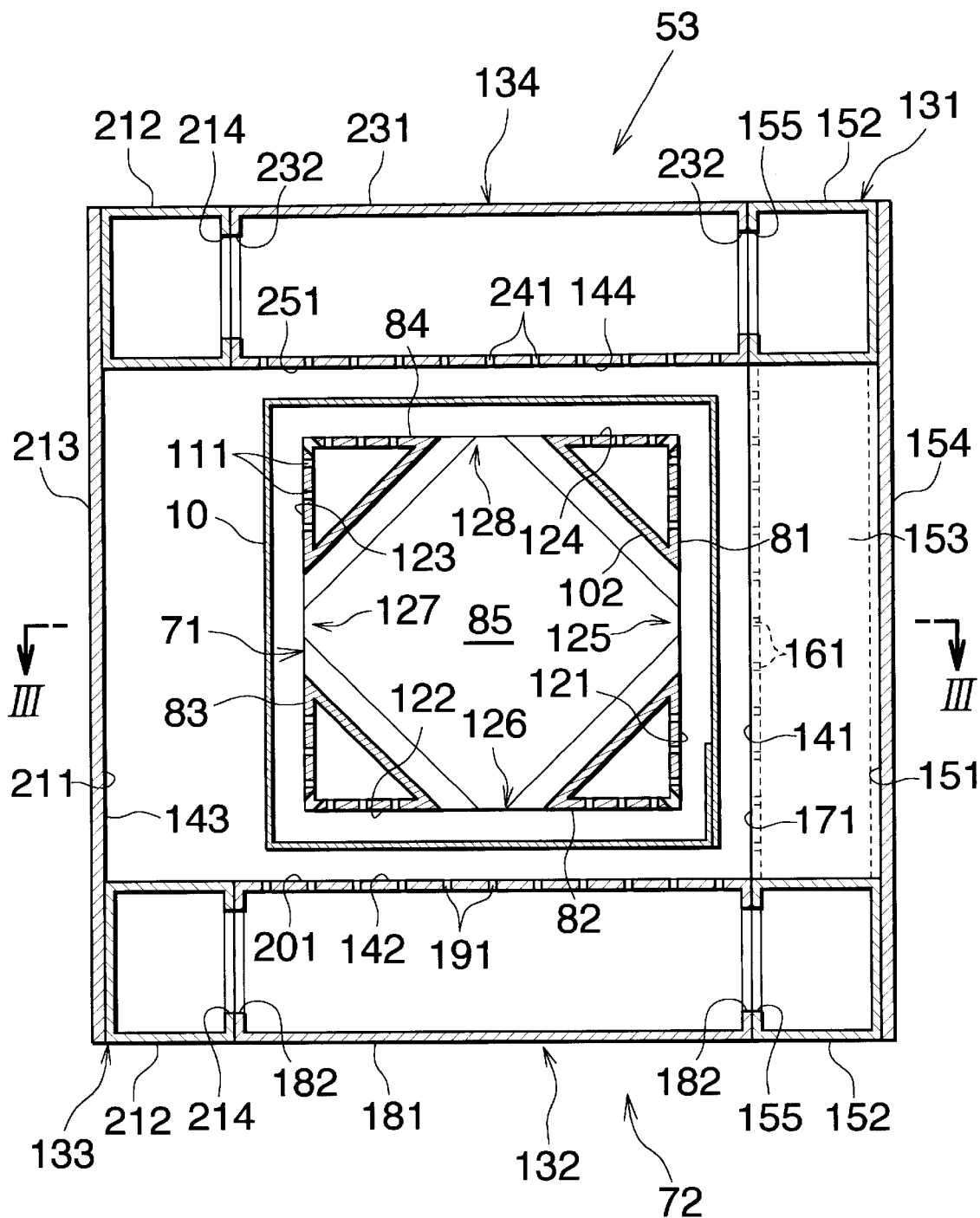
FIG. 2 is a view in cross section taken along the line II—II in FIG. 1.

With reference to FIG. 1, the heating device comprises a hot air supply duct 51, and a hot air nozzle 53 connected to an outlet of the duct 51 by a mount plate 52.

Figure 4:
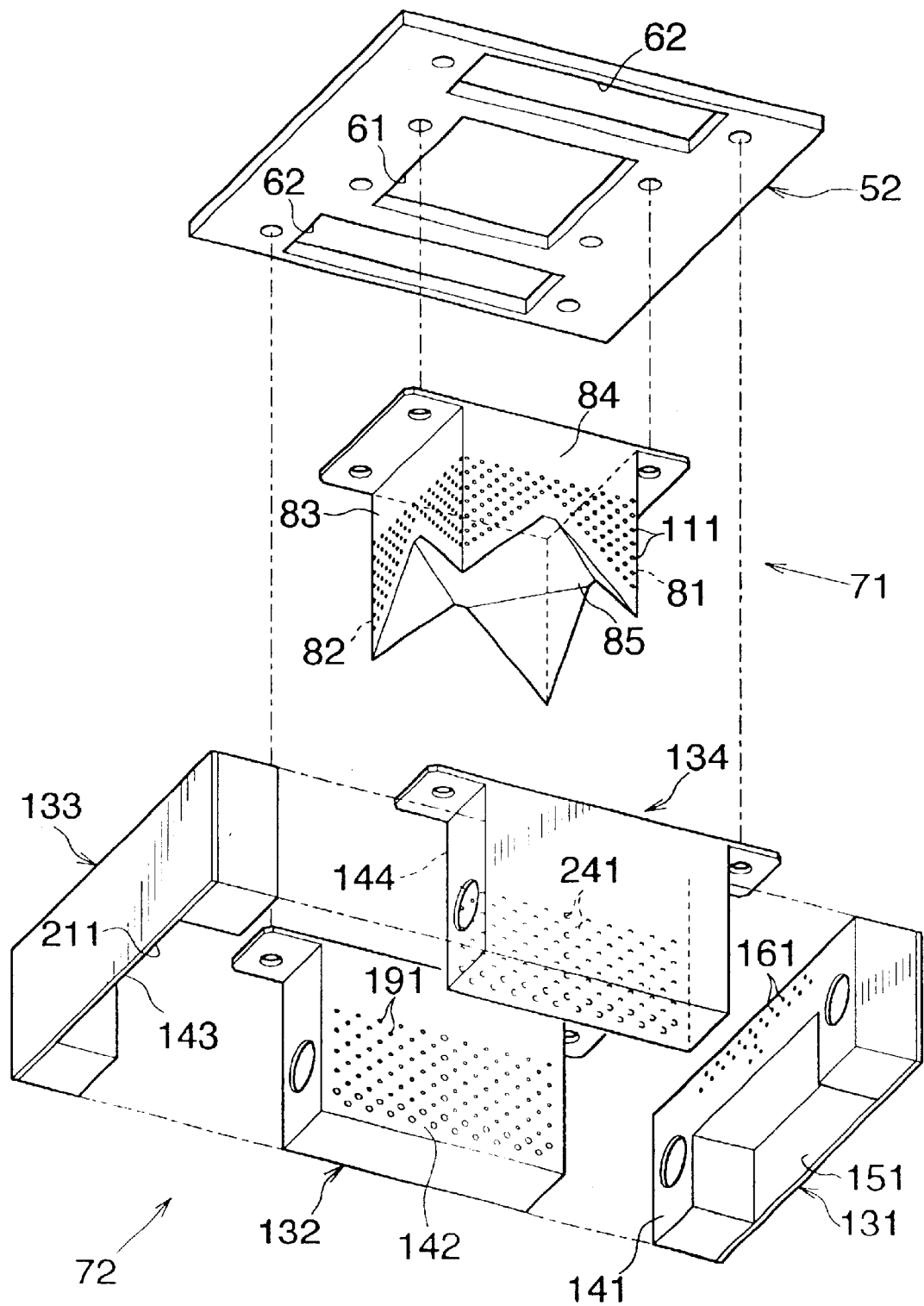
FIG. 4 is an exploded perspective view of the heating device.

With reference to FIG. 4, the mount plate 52 has a central communication opening 61 in its center, and a pair of side communication openings 62 at opposite sides of the opening 61.

The heating nozzle 53 comprises a container inner surface heating nozzle 71 in the form of a bottomed tube having a rectangular to square cross section, and a container outer surface heating annular nozzle 72. The nozzle 71 is attached to the mount plate 52 in a downwardly projecting manner, with an upper end opening thereof in communication with the central opening 61. The annular nozzle 72 is provided around the nozzle 71 and spaced apart therefrom by a predetermined distance.

The hot air nozzle 53 is movable axially of the tubular blank so as to be moved toward or away from the bottom forming portion 13 of the blank. When the nozzle 53 is brought toward the bottom forming portion 13, the inner surface heating nozzle 71 is fitted into the this) portion 13, and the outer surface nozzle 72 is fitted around the portion 13.

Figure 5:
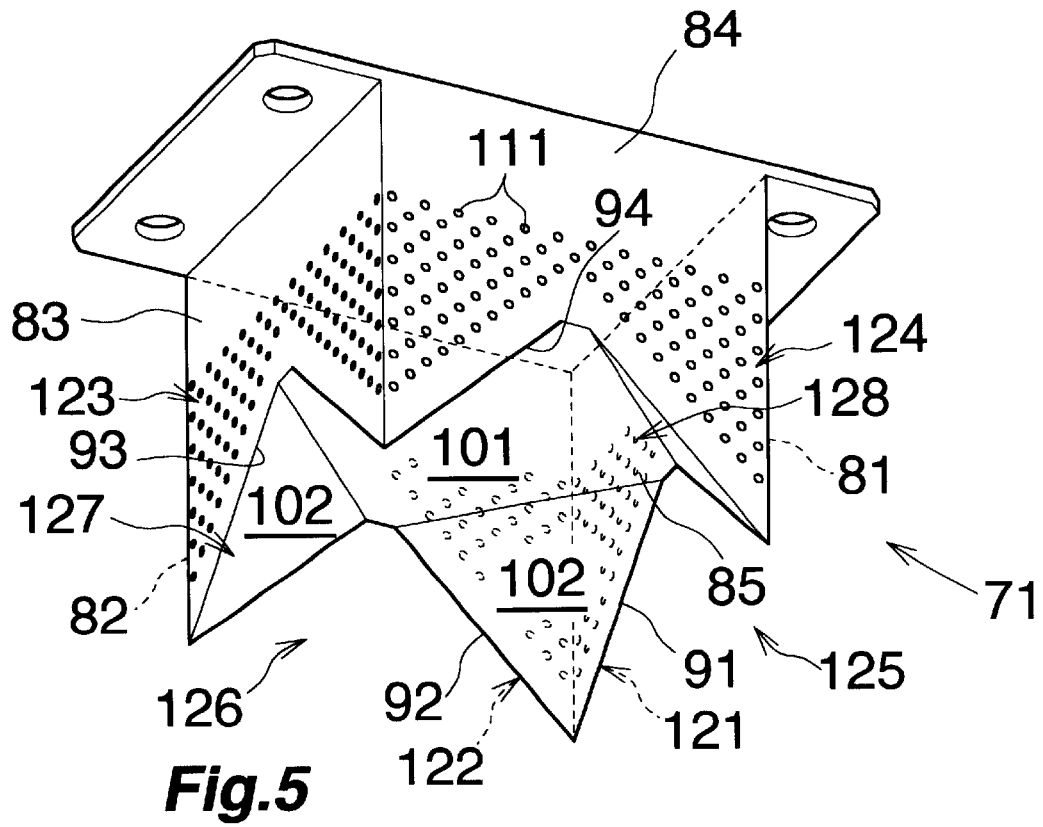
FIG. 5 is a perspective view showing on an enlarged scale part of FIG. 4, i.e., a container inner surface heating nozzle.

As shown in detail in FIG. 5, the inner surface heating nozzle 71 has first to fourth four side walls 81 to 84 continuous with one another and a bottom wall 85.

FIG. 7(b) is a development showing the first to fourth side walls 81 to 84 as seen from outside. The development also shows the first to fourth bottom panels 21 to 24 in phantom lines, as seen from inside and in lapping relation with the side walls.

The four side walls 81 to 84 have first to fourth boundaries 91 to 94, each extending upward from opposite ends of the lower edge of the side wall in an inverted V-shape, and defining therebelow respective recesses 95 to 98 by being recessed inward. The recessed portions 95 to 98 are connected at the center of the nozzle 71, consequently giving no bottom to the recessed portions 95 to 98. The side walls 81 to 84 are flat except at the recesses 95 to 98.

The bottom wall 85 comprises a quadrilateral central wall 101 having straight lines interconnecting the upper ends of the recessed portions 95 to 98 to form an outer periphery of the central wall and positioned at the same level as the upper ends of the recesses 95 to 98, and four triangular corner walls 102 extending from the lower ends of ridgelines of the adjacent side walls 81 to 84 and extending toward respective four sides of the central wall 101 along the recesses 95 to 98 of the side walls 81 to 84.

The first to fourth side walls 81 to 84 have their outer surfaces opposed to the respective inner surfaces of the first to fourth bottom panels 21 to 24 of the bottom forming portion 13 when the hot air nozzle 53 is brought toward the portion 13. In this state, the inverted V-shaped boundaries 91 to 94 match the inverted V-shaped scores 26 or the inverted V-shaped phantom lines 27 of the bottom panels 21 to 24. Accordingly, the portions of the wide walls 81 to 84 other than the recessed porions 95 to 98 thereof correspond to the respective heating regions 31 to 34 of the bottom panels 21 to 24, and the recesses 95 to 98 of the side walls 81 to 84 correspond to the respective nonheating regions 35 to 38 of the bottom panels 21 to 24. The former portions have many orifices 111 distributed in a staggered arrangement to provide first to fourth hot air discharge portions 121 to 124 for the first to fourth side walls 81 to 84. On the other hand, the recessed portions 95 to 98 of the side walls 81 to 84 have no orifices, providing hot air nondischarge portions 125 to 128 which are combined to provide a hot air escape portion for the inner surface.

With reference to FIG. 4 again, the container outer surface heating nozzle 72 comprises first to fourth four nozzle blocks 131 to 134 which are assembled in an annular arrangement so as to correspond to the respective first to fourth bottom panels 21 to 24. These first to fourth nozzle blocks 131 to 134 have first to fourth side walls 141 to 144 to be opposed to the respective first to fourth bottom panels 21 to 24.

Figure 6:
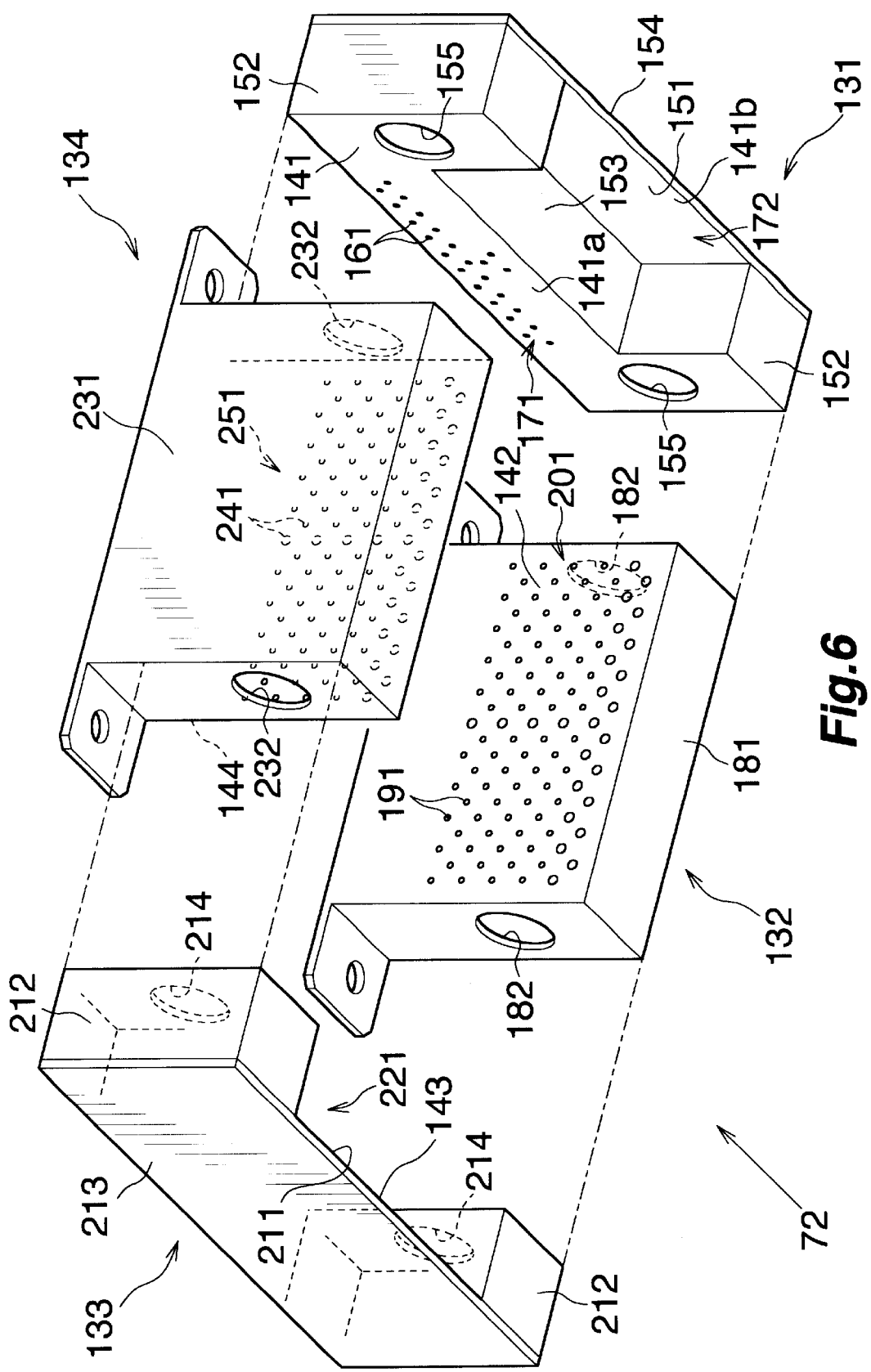
FIG. 6 is a perspective view showing on an enlarged scale part of FIG. 4, i.e., a container outer surface heating nozzle.

The outer surface heating nozzle 72 will be described in detail with reference to FIG. 6. The first nozzle block 131 is in the form of a horizontally elongated rectangular hollow body having a thickness in the widthwise direction and a recessed portion 151 facing inward and opened downward at a lower half thereof except at opposite ends. The nozzle block 131 has hollow portions 152 at opposite ends, a central hollow portion 153 holding upper parts of the portion 152 in communication, and a single plate 154 attached to the outer side of these portions 152, 153. A circular communication hole 155 is formed in the inner side wall of each end hollow portion 152.

The first side wall 141 comprises an upper side wall 141a extending above the recessed portion 151 and providing an inner side wall of the central hollow portion 153, and a lower side wall 141b which comprises the single plate 154 extending to the bottom of the recessed portion 151 and which is retracted from the upper side wall 141a by a distance corresponding to the thickness of the first nozzle block 131.

Orifices 161 are formed in the approximate upper half of the upper side wall 141a. The portion having these orifices 161 provides a first hot air discharge portion 171. The recessed portion 151, which has no orifices, provides a first hot air nondischarge portion 172 which also serves as a first outer surface hot air escape portion.

The second nozzle block 132 comprises a horizontally elongated rectangular hollow body 181 having an upper-end opening in communication with one of the side communication openings 62 and having a thickness in the widthwise direction and a uniform cross section. The hollow body 181 has a circular communication hole 182 in each of opposite end walls thereof.

The hollow body 181 has an inner side wall which in its entirety provides the second side wall 142. The second side wall 142 has many orifices 191 approximately over the entire area thereof except at its upper edge portion. The portion having the orifices 191 provides a second hot air discharge portion 201.

The third nozzle block 133 has an upwardly and downwardly open recessed portion 211 and comprises hollow portions 212 at opposite ends and a single plate 213 provided on the rear side of these portions. A circular communication hole 214 is formed in the inner side wall of each of the end hollow portions 212.

The third side wall 143 comprises a single plate 213 providing the bottom of the recessed portion 211. The third side wall 143 has no orifices and accordingly provides a hot air nondischarge portion 221. The recessed portion 211 provides a second hot air escape portion for the outer surface.

The fourth nozzle block 134 comprises a hollow body 231 having the same construction as the body 181 of the second nozzle block although facing toward the opposite direction. The hollow body 231 has communication holes 232.

The fourth side wall 144 is provided by the inner side wall of the hollow body 231 and has orifices 241 and a third hot air discharge portion 251.

The first nozzle block 131 and the third nozzle block 133 are opposed to each other, the second and fourth nozzle blocks 132, 134 are opposed to each other, and the second and fourth nozzle blocks 132, 134 are held between opposite ends of the first and third nozzle blocks 131, 133, whereby the first to fourth nozzle blocks 131 to 134 are assembled.

In this state, the first to fourth nozzle blocks 131 to 134 have their bottom faces positioned flush with one another, and the communication holes 155, 182, 214 and 232 of the adjacent first to fourth blocks 131 to 134 are in communication.

FIG. 8(b) is a development of the first to fourth side walls 141 to 144 as seen from inside, in combination with a development of the first to fourth bottom panels 21 to 24 as seen from outside.

The first hot air discharge portion 171 of the first side wall 141 is in match with the first heating region 41 of the first bottom panel 21, the second hot air discharge portion 201 of the second side wall 142 is in match with the second heating region 42 of the second bottom panel 22, and the third hot air discharge portion 251 of the fourth side wall 144 is in match with the third heating region 43 of the fourth bottom panel 24. The first hot air nondischarge portion 172 of the first side wall 141 corresponds to the first nonheating region 44 of the first bottom panel 21, and the second hot air nondischarge portion 221 of the third side wall 143 corresponds to the second nonheating region 45 of the first bottom panel 23.

Figure 3:
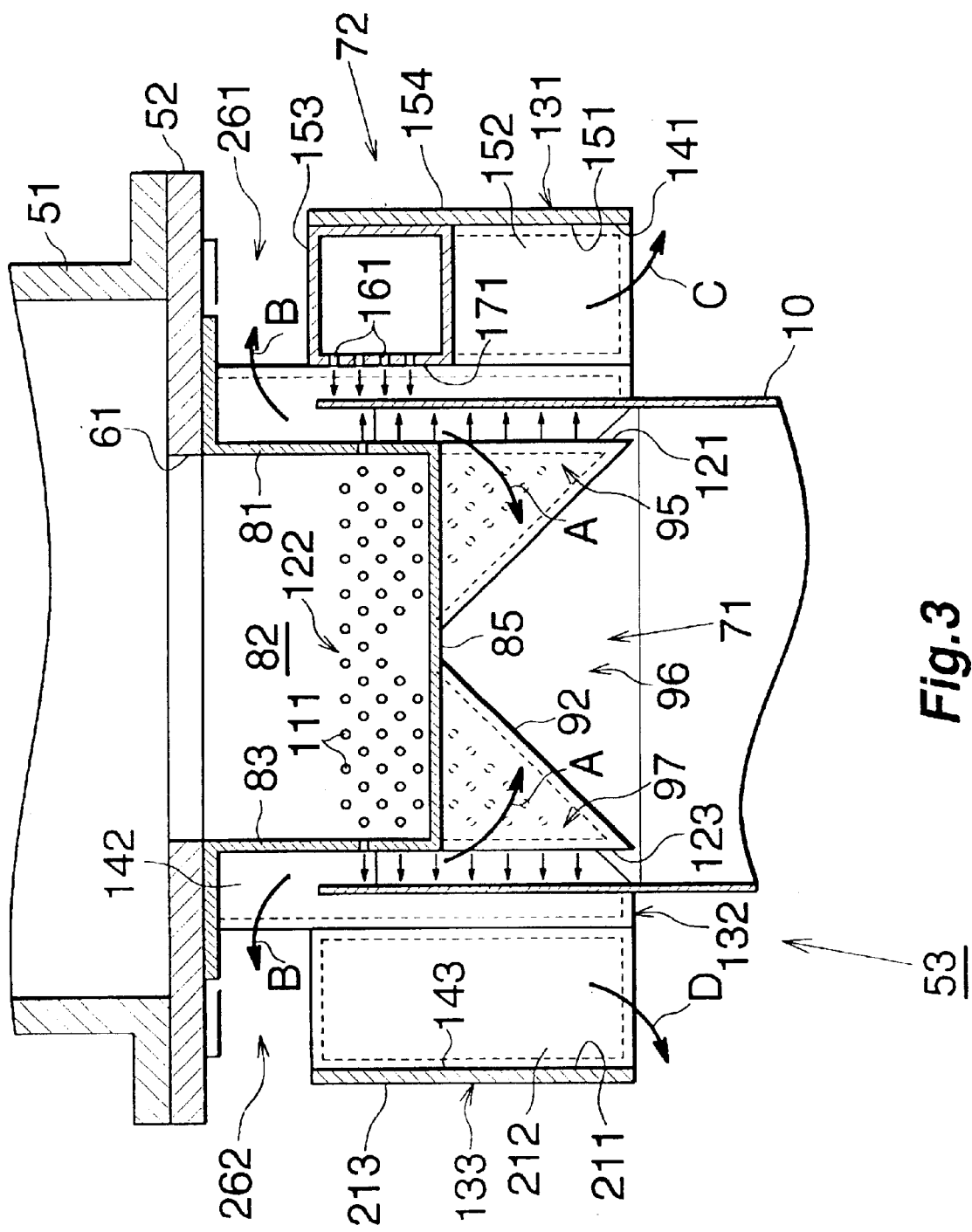
FIG. 3 is a view in vertical section taken along the line III—III in FIG. 2.

The first and third nozzle blocks 131, 133 are different from the second and fourth nozzle blocks 132, 134 in height. As shown in FIG. 3, a first hot air vent clearance 261 corresponding to this difference in height is produced between the mount plate 52 and the first nozzle block 131, and a second hot air vent clearance 262 corresponding to the difference is produced between the mount plate 52 and the third nozzle block 133.

Referring mainly to FIG. 3, hot air is supplied to the hot air nozzle 53 through the hot air duct 51. The container inner surface heating nozzle 71 heats the inner surface of the bottom forming portion 13, while the container outer surface heating nozzle 72 heats the outer surface of the bottom forming portion 13.

In heating the inner surface of the bottom forming portion 13, the first to fourth heating regions 31 to 34 of the inner surface are heated concentrically with thee hot air forced out from the first to fourth hot air discharge portions 121 to 124 of the inner surface heating nozzle 71, whereas the first to fourth nonheating regions 35 to 38 of the inner surface is not heated since no hot air is forced out from the first to fourth hot air nondischarge portions 125 to 128. There is the possibility that the hot air forced out from the first to fourth discharge portions 121 to 124 will partly heat the first to fourth nondischarge portions 125 to 128 adjacent to these discharge portions 121 to 124, whereas these portions 125 to 128 are positioned within the recesses 95 to 98 and are remote from the discharge portions 125 to 128. Accordingly the radiant heat due to the heating of the nondischarge portions 125 to 128 is unlikely to heat the first to fourth nonheating regions 35 to 38. Furthermore, the hot air forced out from the first to fourth hot air discharge portions 121 to 124 is released as indicated by arrows A through the recesses 95 to 98 after heating the heating regions 31 to 34. This obviates the likelihood that the hot air will heat the nonheating regions 35 to 38. Portions of the hot air flow out of the nozzle 53 through the clearances 261, 262 as indicated by arrows B.

In heating the outer surface of the bottom forming portion 13, the hot air forced out from the first hot air discharge portion 171 of the first side wall 141 first heats the first heating region 41 of the first bottom panel 21, whereas the first nonheating region 44 is not heated since no hot air is forced out from the first hot air nondischarge portion 172. Even if the portion 172 is heated with the hot air, this portion 172 is remote from the nonheating region 44, which is therefore unlikely to be heated. The hot air forced out form the discharge portion 171 flows out of the nozzle 53 through the recessed portion 151 as indicated by an arrow C without heating unnecessary portions such as the first nonheating region 44. The hot air is discharged also through the paths indicated by the arrows B.

The hot air forced out from the second hot air discharge portion 201 of the second side wall 42 heats the second heating region 42 which is approximately the entire area of the second bottom panel 22. The third side wall 43 has no hot air discharge portion, so that the second nonheating region 45 which is approximately the entire area of the third bottom panel 23 remains unheated. The fourth bottom panel 24 is heated in the same manner as the second side panel 22.

The hot air forced out from the outer surface heating nozzle 72 is discharged from the nozzle 53 through the path indicated by the arrow C and also through the path indicated by an arrow D, i.e., through the recessed portion 211 of the third side wall 143. This effectively eliminates the likelihood of hot air remaining in the nozzle 43 and heating the unnecessary portions.

Modifications of container inner surface heating nozzle 71 will be described next with reference to FIGS. 9 to 11. Throughout FIGS. 5 and 9 to 11, like parts will be referred to by like reference numerals.

Figure 9:
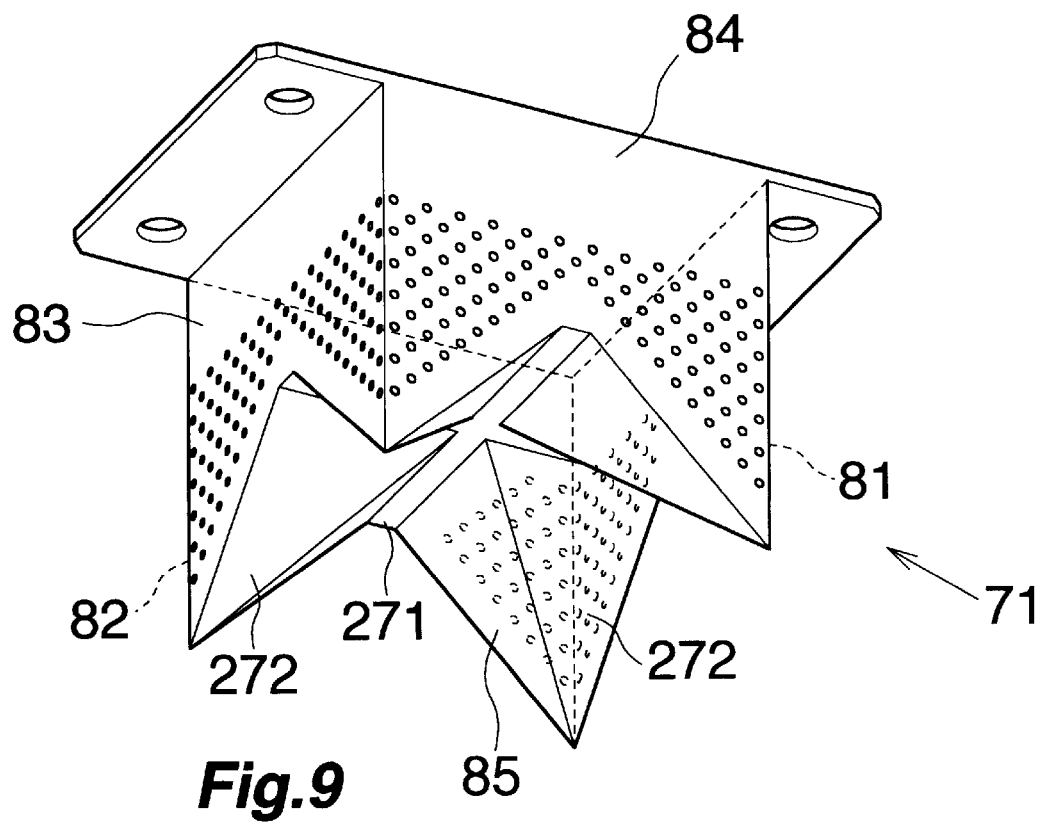
FIG. 9 is a perspective view corresponding to FIG. 5 and showing a modified container inner surface heating nozzle.

FIG. 9 shows a container inner surface heating nozzle 71 which has four side walls 81 to 84 and a bottom wall 85 like the one shown in FIG. 5.

The four side walls 81 to 84 have the same construction as those shown in FIG. 5. Although the bottom wall 85 shown in FIG. 5 comprises a quadrilateral central wall 101 and four triangular corner walls 102, the bottom wall of this modification has a cross-shaped central wall 271 in place of the quadrilateral central wall 101. A corner wall 272 L-shaped in cross section extends from each pair of two orthogonal bar portions of the wall 271 to the lower end of ridgeline of the adjacent side walls (indicated, for example, at 81 and 82).

Figure 10:
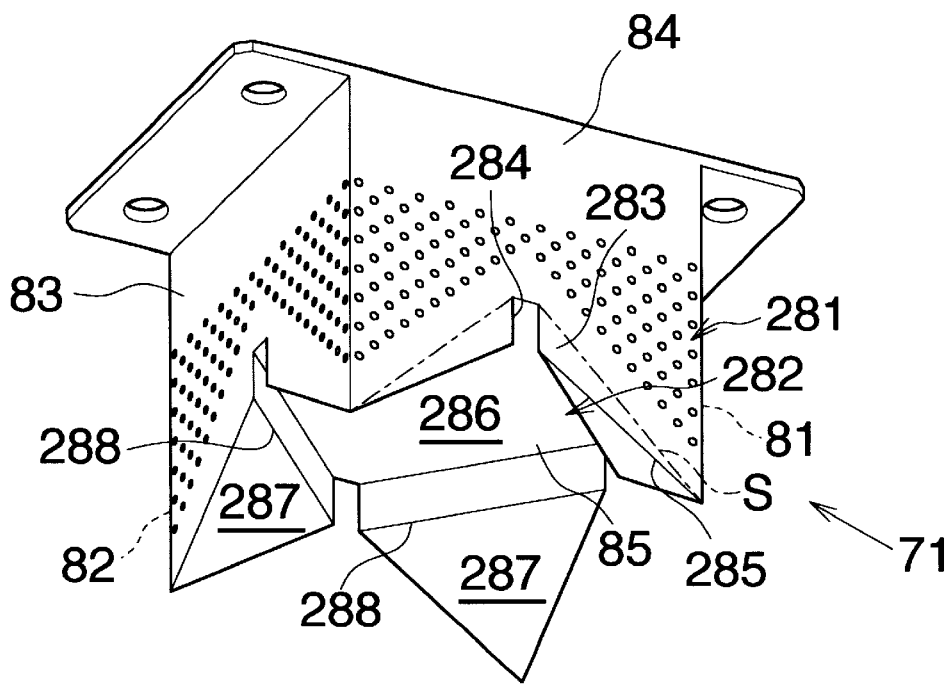
FIG. 10 is a perspective view corresponding to FIG. 5 and showing another modified container inner surface heating nozzle.

FIG. 10 shows a container inner surface heating nozzle 71 which comprises four side walls 81 to 84 and a bottom wall 85 as is the case with the one shown in FIG. 5 or 9. Furthermore, each of side walls 81 to 84 comprises a hot air discharge portion and a hot air nondischarge portion like the side walls of FIG. 5 or 9. Since the four side walls are the same in construction, the fourth side wall 84 only will be described below. The side wall 84 of this modification has a hot air discharge portion 281, a hot air nondischarge portion 282, and a boundary between these portions which is indicated in a phantom line S. With the embodiment shown in FIG. 5 or 9, the entire nondischarge portion 128 provides the recessed portion 98 serving as a hot air escape portion, while the present modification has a portion proximate to the discharge portion, i.e., a flat portion 283 flush with the discharge portion, and a recessed portion 285 having a generally inverted V-shaped contour provided with an upward projection 284 at the upper end of the recessed portion is provided only below the flat portion 283. The bottom wall 85, like the one shown in FIG. 5, comprises quadrilateral central wall 286 and four triangular corner walls 287. A bent portion 288 corresponding to the upward projection 284 is formed close to the upper end of the corner wall 287.

Figure 11:
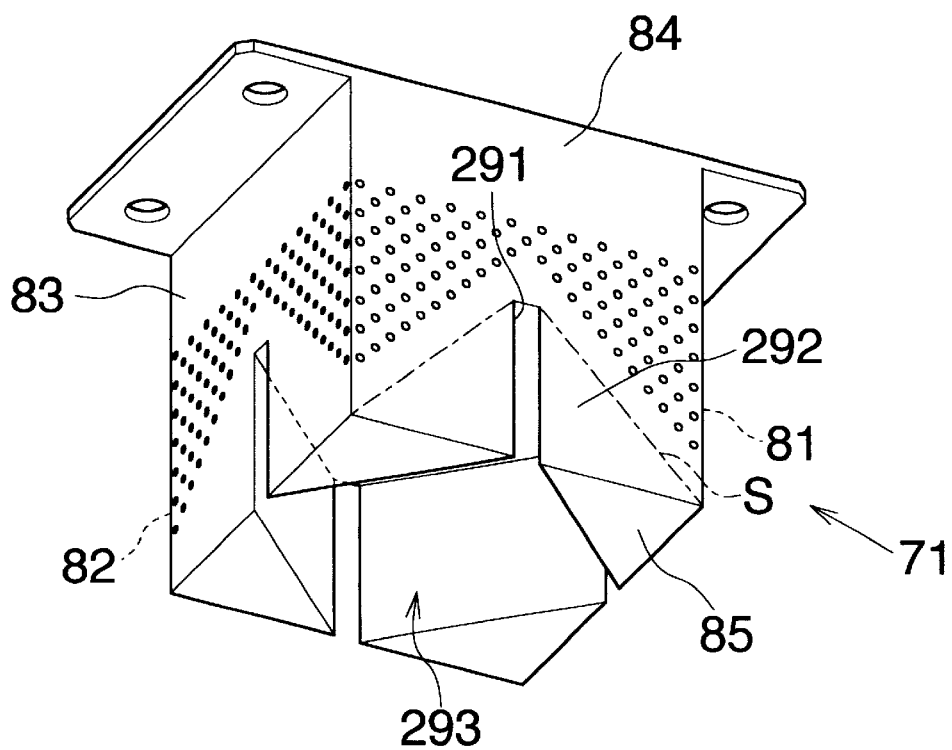
FIG. 11 is a perspective view corresponding to FIG. 5 and showing another modified container inner surface heating nozzle.

The recessed portion 285 shown in FIG. 10 is further made narrower in FIG. 11. Over the entire area below the boundary S, a flat portion 292 is provided except for a vertical narrow central slit 291. On the other hand, the bottom wall 85 is provided with a recessed portion 293 having a quadrilateral contour in horizontal section. The recessed portion 293 is in communication with the slit 291 at each of corners. Accordingly, the slits 291 and the recessed portion 293 provide a hot air escape portion.

The recessed portion formed by the side walls of the container inner surface heating nozzle is in communication with the center of the nozzle and has no bottom, whereas like the recessed portion formed in the first side wall of the container outer surface heating nozzle, the recessed portion may alternatively be provided with a bottom insofar as the portion having the recessed portion is positioned as retracted from the portion having no recess.

Container Top Heating Device

Figure 18:
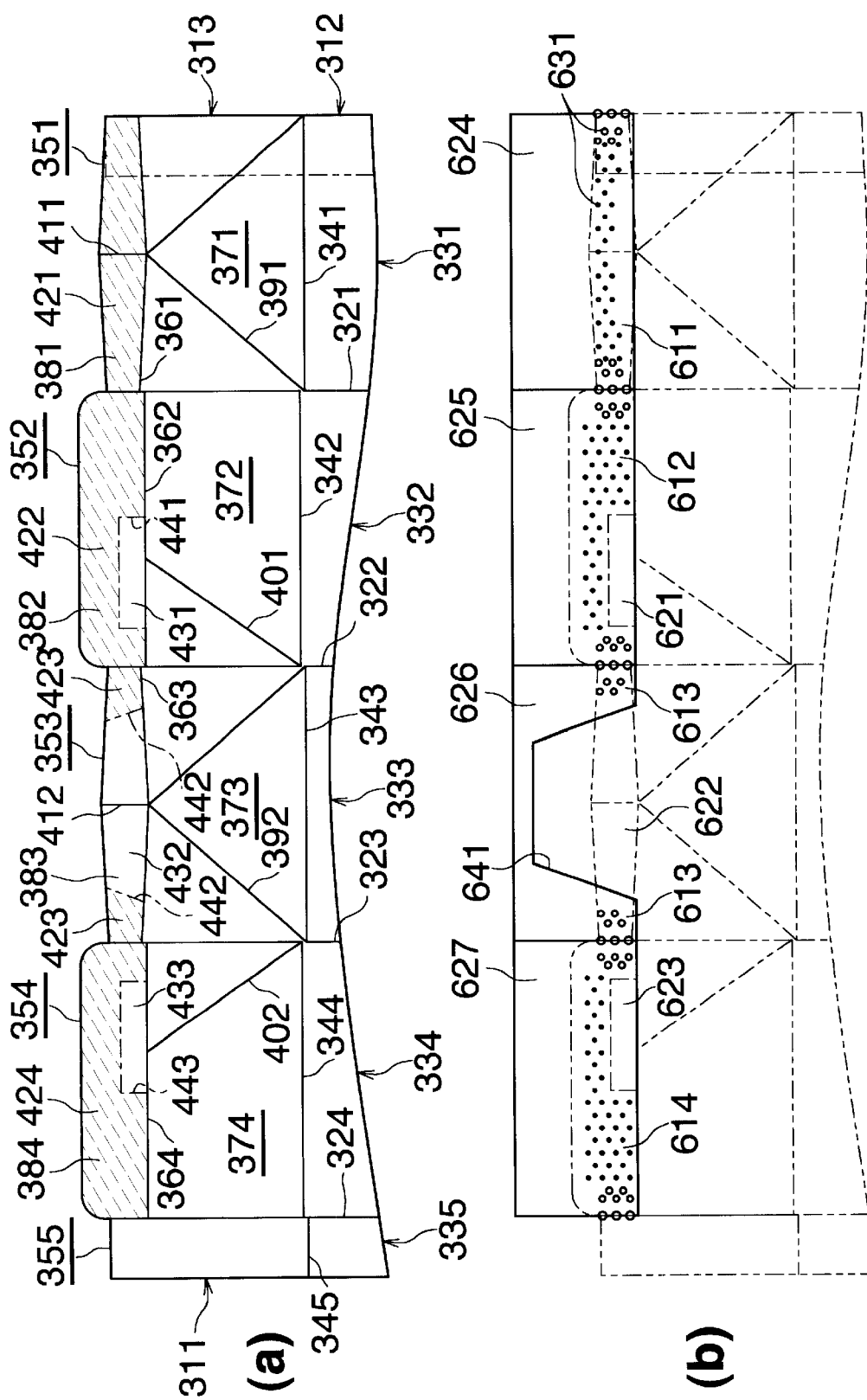
FIG. 18 includes developments of the inner surface of a container top forming portion and the container inner surface heating nozzle.
Figure 19:
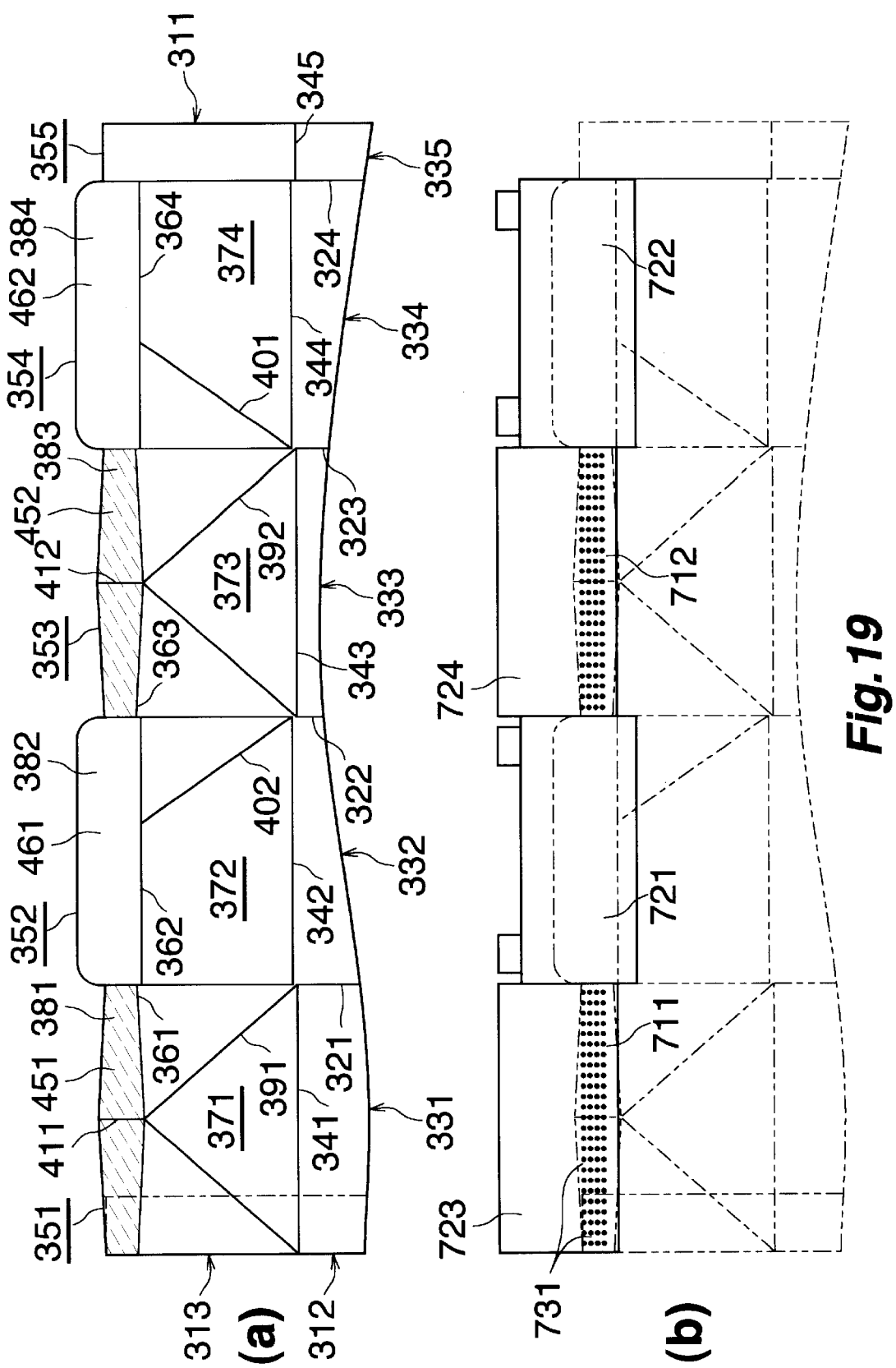
FIG. 19 includes developments of the outer surface of the container top forming portion and a container outer surface heating nozzle.

FIG. 18(a) and FIG. 19(a) are developments showing a trunk forming portion 312 of a blank 311 and a top forming portion 313 extending from the upper end of the portion 312. FIG. 18(a) shows the blank 311 as seen form inside, and FIG. 19(a) shows the blank 311 as seen from outside.

The blank 311 has first to-fourth blank scores 321 to 324 arranged from the right leftward and extending vertically for folding the blank into a tube of square to rectangular cross section, whereby the blank 311 is divided into first to fifth panels 351 to 335 continuous with one another as arranged from the right leftward. The entire outer surface of the fifth panel 335 is sealed to the inner surface of left edge portion of the first panel 331, whereby the blank 311 is made into a tube of square to rectangular cross section.

The first to fifth panels 331 to 335 have first to fifth top scores 341 to 345 extending horizontally and arranged one after another from the right leftward for dividing the top forming portion 313 from the trunk forming portion 312 and for folding the top forming portion 313.

The top forming portion 313 comprises first to fifth top panels 351 to 355 divided by the first to fifth top scores 341 to 345 and continuous with one another as arranged from the right leftward, with the first to fourth blank scores 321 to 324 positioned between the top panels. These top panels 351 to 355 are folded into a gabled roof form having an upper edge seal rib.

In the vicinity of the upper edges of the first to fourth top panels 351 to 354, first to fourth rib scores 361 to 364 continuously extend one after another as arranged from the right leftward for forming the upper edge seal rib by folding. The first to fourth top panels 351 to 354 are divided into first to fourth roof panels 371 to 374 and first to fourth seal panels 381 to 384 by the first to fourth rib scores 361 to 364, respectively.

The first and third roof panels 371, 373 are provided with inverted V-shaped first and second roof scores 391, 392 for forming a rear portion of the roof by folding. The second roof panel 372 has a slanting first spout score 401 for forming a spout by folding. The fourth roof panel 374 has a second spout score 402 which is slanted in the opposite direction to the score 401. The first and third seal panels 381, 383 have respective first and second lapping scores 411, 412 extending upward from the upper ends of the first and second roof scores 391, 392 for folding the first and third seal panels 381, 383 in two to form laps.

With reference to FIG. 19(a), a group of scores are formed in the outer surface which are the same as the score group formed in the inner surface and described with reference to FIG. 18(a), each corresponding pair of inner and outer scores being in register. This register relationship will be apparent with reference to the reference numerals and therefore will not be described.

A description will be given of first to fourth inner surface heating regions 421 to 424 and first to third inner surface nonheating regions 431 to 433 shown in FIG. 18(a). The heating regions 421 to 424 are indicated by hatching.

A portion of the second rib score 362 extending along the approximate left half of this score and formed in the inner surface of the second seal panel 382 is provided with a downwardly facing channel-shaped first phantom line 441 surrounding a rectangular region along with the score 362. Second phantom lines 442 extending upward and toward each other are formed close to opposite ends of the third seal panel 383 in the inner surface of this panel. The inner surface of the fourth seal panel 384 is provided with a third phantom line 443 in exactly opposite relation with the line 441 in the second seal panel 382.

The first inner surface heating region 421 is the entire area of the inner surface of the first seal panel 381. In the second seal panel 382, the outside area of the first phantom line 441 is the second inner surface heating region 422, and the inside area thereof is the first inner surface nonheating region 431. In the third seal panel 383, the outside areas of the second phantom lines 442 are the second inner surface heating regions 423, and the inside area defined by the lines 442 is the second inner surface nonheating region 432. Like the second seal panel 382, the fourth seal panel 384 has the fourth inner surface heating region 424 and the third inner surface nonheating region 433, as divided by the third phantom line 443.

FIG. 19(a) shows first and second outer surface heating regions 451, 452, and first and second outer surface nonheating regions 461, 462.

The first and second outer surface heating regions 451, 452 are provided by the entire areas of the outer surfaces of the first and third seal panels 381, 383, respectively. The first and second outer surface nonheating regions 461, 462 are provided by the entire areas of the outer surfaces of the second and fourth seal panels 382, 384.

Figure 13:
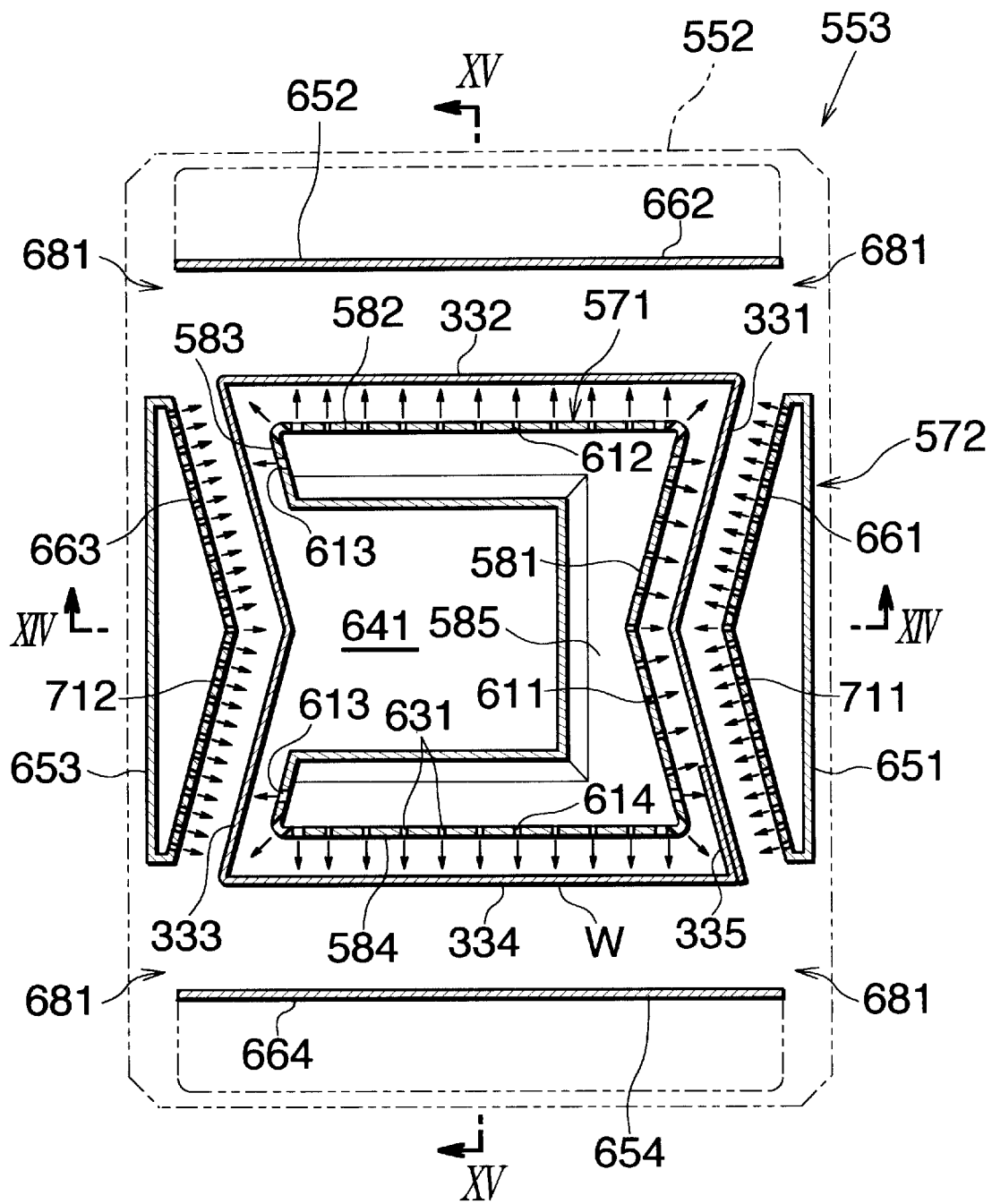
FIG. 13 is a view in horizontal cross section of the heating device.
Figure 14:
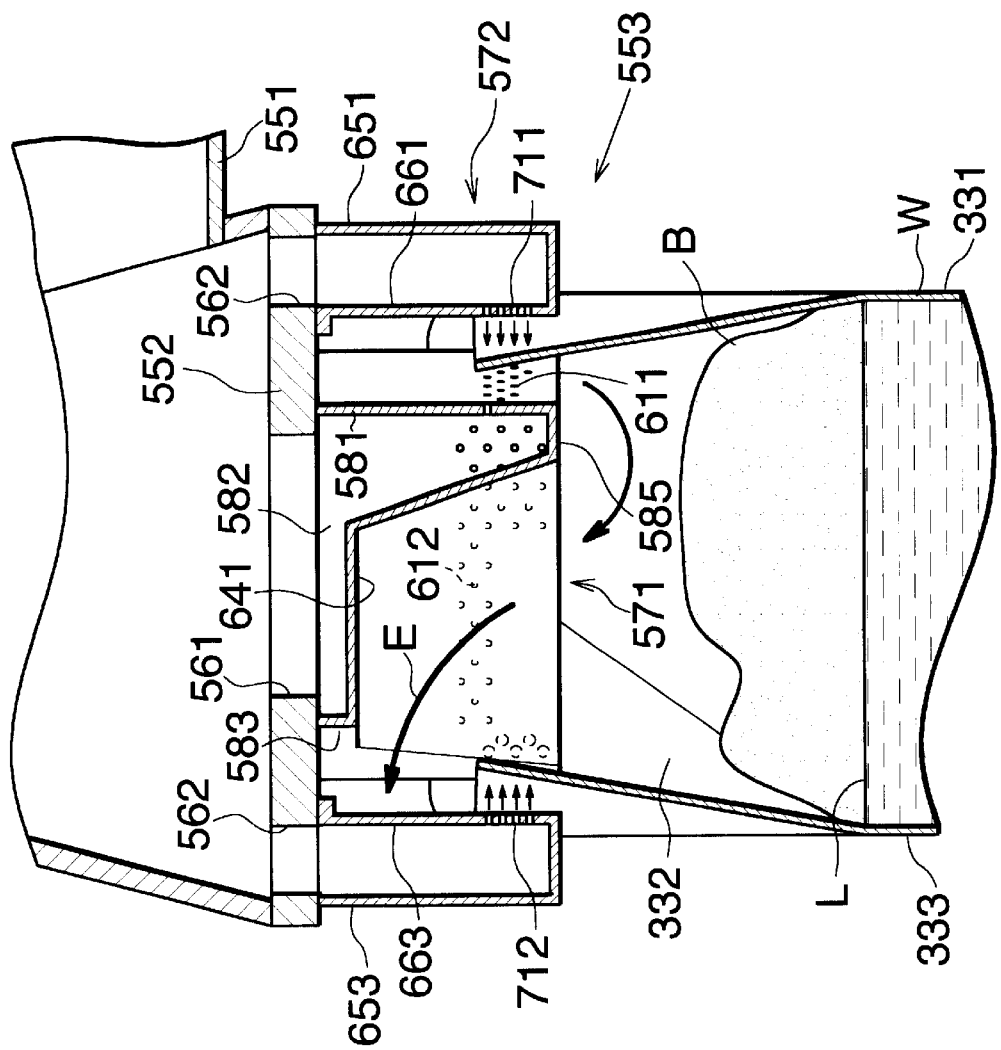
FIG. 14 is a view in vertical section taken along the line XIV—XIV of FIG. 13.
Figure 15:
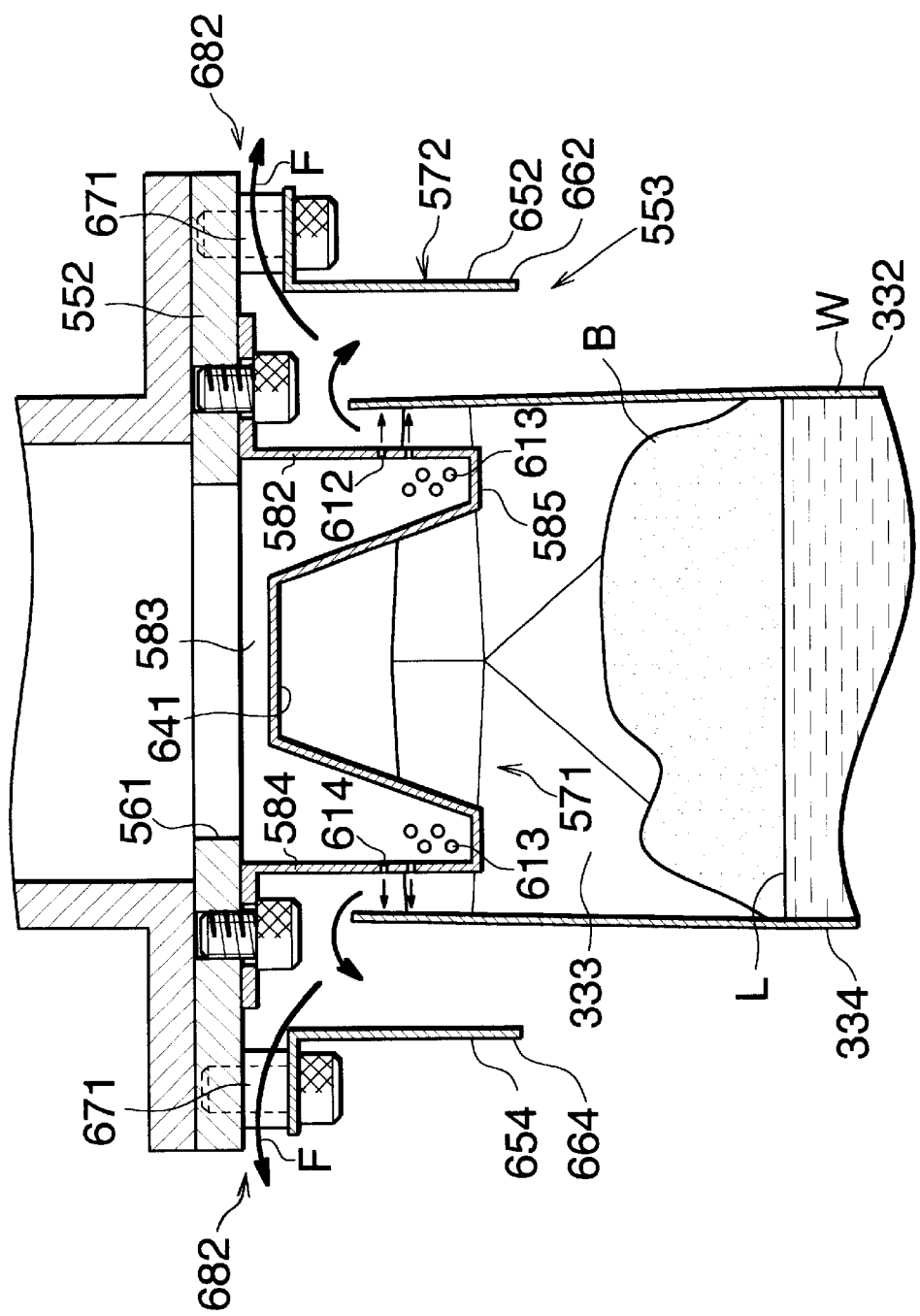
FIG. 15 is a view in vertical section taken along the line XV—XV of FIG. 13.

Next, a heating device for heat-sealing the top portions of containers will be described. Before heating the top forming portion 313, folds are formed in this portion 313. The first and third top panels 351, 353 are inclined inward so as to be generally V-shaped in horizontal section (see FIGS. 13 and 14).

Figure 12:
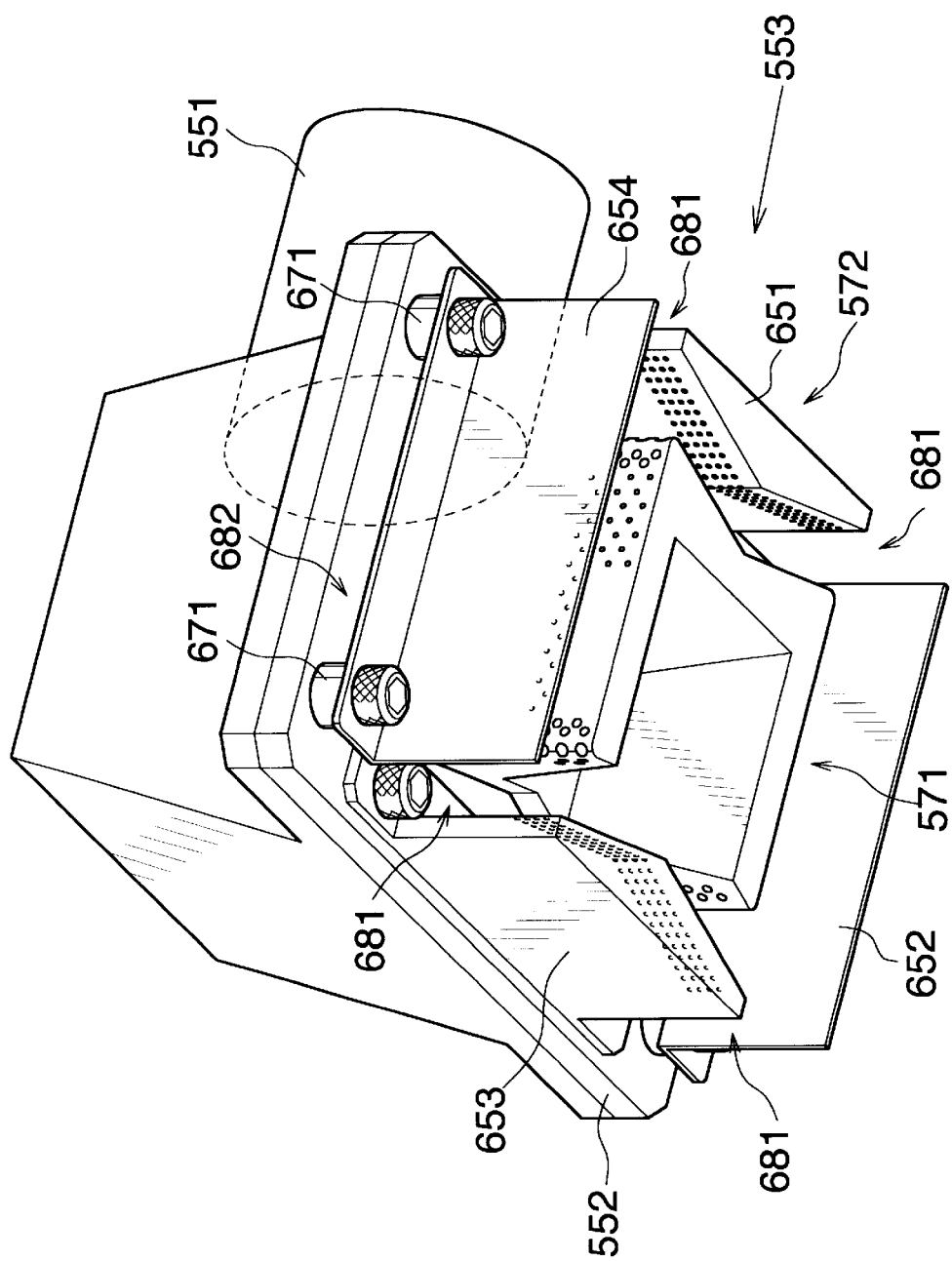
FIG. 12 is a perspective view of a container top heating device according to the invention.

FIG. 12 shows a hot air supply duct 551, and a hot air nozzle 553 connected to the outlet of the duct by a mount plate 552.

Figure 16:
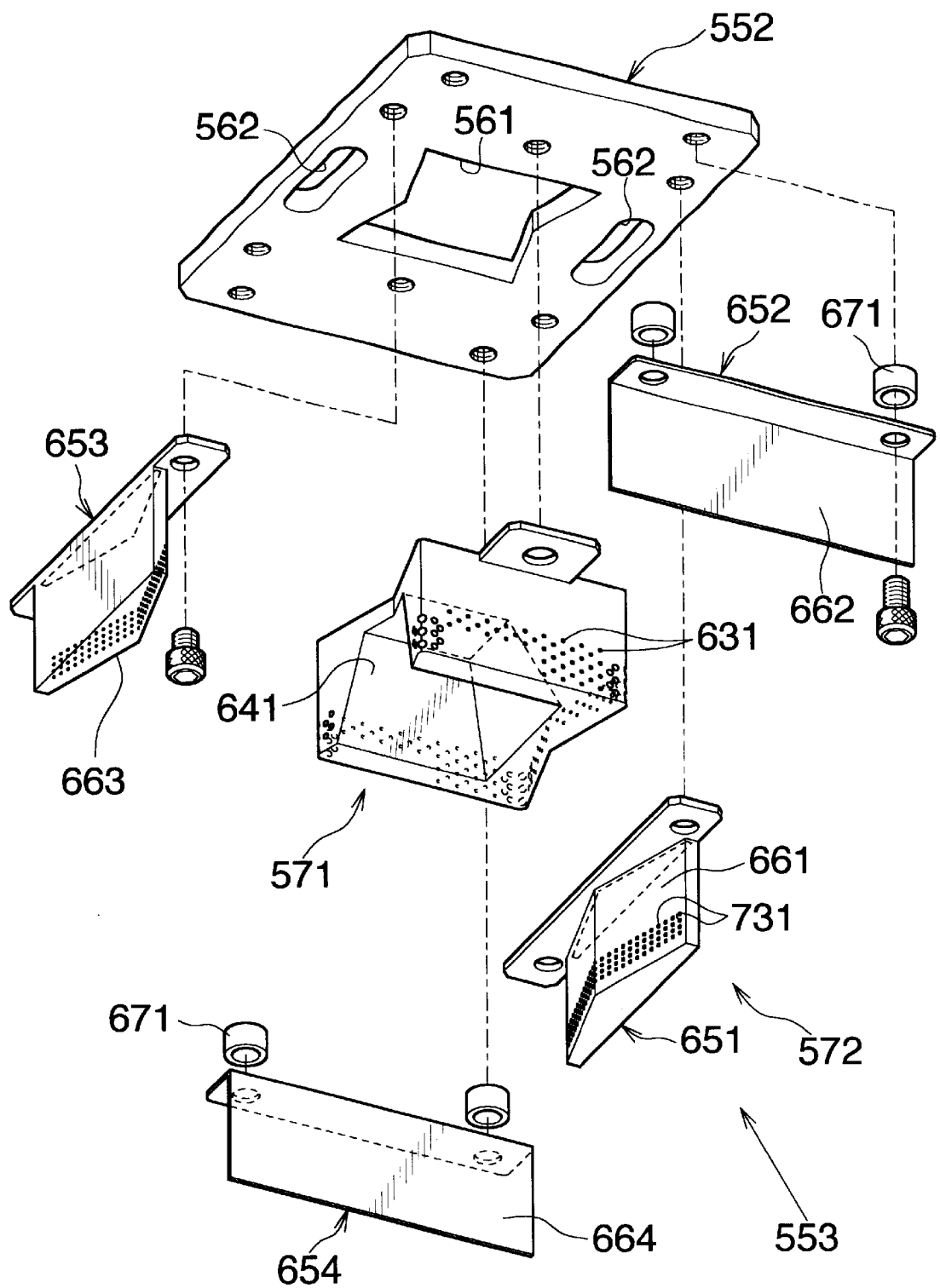
FIG. 16 is an exploded perspective view of the heating device.

With reference to FIG. 16, the mount plate 552 has a central communication opening 561 in its center, and a pair of side communication openings 562 at opposite sides of the opening 561.

The heating nozzle 553 comprises a container inner surface heating nozzle 571 in the form of a bottomed tube having a rectangular to square cross section, and a container outer surface heating nozzle 572. The nozzle 571 is attached to the mount plate 552 in a downwardly projecting manner, with an upper end opening thereof in communication with the central opening 561. The nozzle 72 is provided around the nozzle 571 and spaced apart therefrom by a predetermined distance.

The hot air nozzle 553 is movable axially of the tubular blank 311 so as to be moved toward or away from the top forming portion 313 of the blank. When the nozzle 553 is brought toward the top forming portion 313, the inner surface heating nozzle 571 is fitted into the this portion 313, and the outer surface nozzle 572 is fitted around the portion 313.

Figure 17:
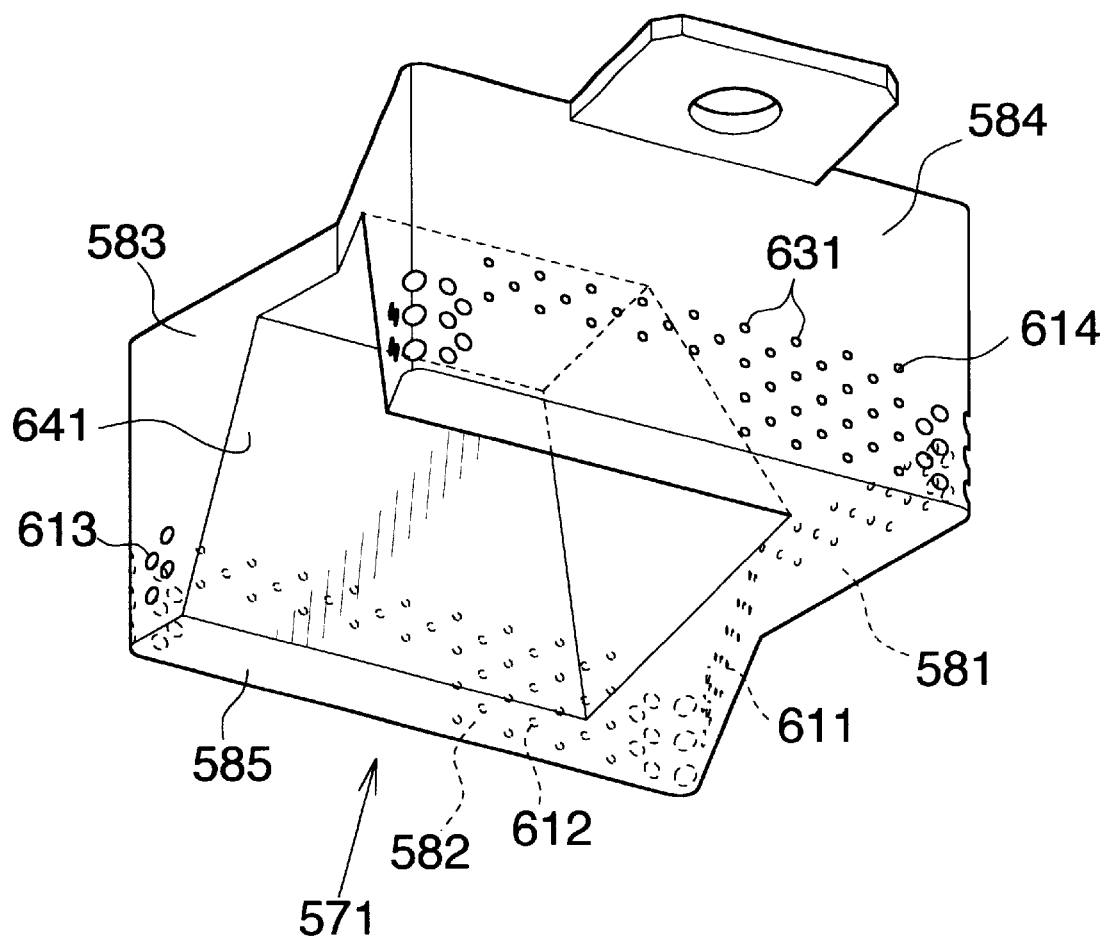
FIG. 17 is a perspective view showing on an enlarged scale part of FIG. 16, i.e., a container inner surface heating nozzle.

As shown in detail in FIG. 17, the inner surface heating nozzle 571 has first to fourth four side walls 581 to 584 continuous with one another and a bottom wall 585.

FIG. 18(b) is a development showing the first to fourth side walls 581 to 584 as seen from outside. The development also shows the first to fifth top panels 351 to 355 in phantom lines, as seen from inside and in lapping relation with the side walls.

The first and third side walls 583 are bent to an approximately V-shaped form in horizontal section so as to correspond to the folds of the first and third top panels 351, 353. The second and fourth side walls 582, 584 are flat.

Along lower edges of the first to fourth side walls 581 to 584, first to fourth hot air discharge portions 611 to 614 for the inner surface are formed in corresponding relation with the first to fourth inner surface heating regions 421 to 424. Fourth to seventh hot air nondischarge portions 624 to 627 for the inner surface are provided above the first to fourth hot air discharge portions 611 to 614 of the first to fourth side walls 581 to 584.

The first to fourth hot air discharge portions 611 to 614 have many orifices as distributed in a generally staggered arrangement.

A recessed portion 641 is formed by recessing the third side wall 583 extending to bottom wall 585. In the third side wall 583, the recessed portion 641 provides the entire second hot air nondischarge portion 622 further extends upward to the sixth nonheating region 626. The entire recessed portion 641 provides a hot air escape portion for the inner surface.

In the bottom wall 585 of the container inner surface heating nozzle 571, the recessed portion 641 extends beyond the central part of the bottom wall 585, and has a bottom extending close to the first side wall 581.

With reference to FIG. 16 again, the container outer surface heating nozzle 572 comprises first to fourth nozzle elements 651 to 654 corresponding to the first to fourth side walls 581 to 584 of the container inner surface heating nozzle 571.

The first to fourth nozzle elements 651 to 654 have first to fourth side walls 661 to 664, respectively. When the outer surface heating nozzle 572 is fitted around the top forming portion 313, these first to fourth side walls 661 to 664 are opposed to the first to fourth top panels 351 to 355, respectively. The first and third side walls 661, 663 are approximately V-shaped so as to correspond to the first and third side walls 581, 583 of the inner surface heating nozzle 571.

The first nozzle element 651 is in the form of a laterally elongated hollow body having an upper end connected to one of the side communication openings 562 and having a thickness in the widthwise direction. The second nozzle element 652 comprises a single plate. The third nozzle element 653 has the same construction as the first nozzle element 651 although facing toward the opposite direction with respect to the inward-outward relationship. The fourth nozzle element 654 comprises a single plate of the same construction as the second nozzle element 652 although facing toward the opposite direction with respect to the inward-outward relationship.

The first and third nozzle elements 651, 653 are attached to the mount plate 552 with their upper ends in contact with the plate 552, whereas the second and fourth nozzle elements 652, 654 are attached to the mount plate 552, with spacers 671 interposed between the plate 552 and these elements.

With the first to fourth nozzle elements 651 to 654 attached to the mount plate 552, a first hot air vent clearance 681 is formed between each pair of adjacent nozzle elements. Furthermore, a second hot air vent clearance 682 is formed by the spacers 671 between the mount plate 552 and each of the second and fourth nozzle elements 652, 654.

FIG. 19(b) is a development of the first to fourth side walls 661 to 664 as seen from inside, in combination with a development of the first to fifth top panels 351 to 355 as seen from outside.

Provided for the first and third top panels 351, 353 are respective first and second hot air discharge portions 711, 712 for the outer surface which correspond to the first and second outer surface heating regions 451, 452. For the second and fourth top panels 352, 354 are provided respective first and second hot air nondischarge portions 721, 722 for the outer surface which correspond to the first and second outer surface nonheating regions 461, 462. Third and fourth hot air nondischarge portions 723, 724 for the outer surface are provided above the first and second hot air discharge portions 711, 712.

The first and second hot air discharge portions 711, 712 for the outer surface have many orifices, but the first and second hot air nondischarge portions 721, 722 for the outer surface have no orifices.

Hot air is supplied to the hot air nozzle 553 through the hot air duct 551. The container inner surface heating nozzle 571 heats the inner surface of the top forming portion 313, while the container outer surface heating nozzle 572 heats the outer surface of the top forming portion 313.

In heating the inner surface of the top forming portion 313, the first to fourth heating regions 421 to 424 of the inner surface are heated concentrically with the hot air forced out from the first to fourth hot air discharge portions 611 to 614, whereas the first to fourth nonheating regions 441 to 443 of the inner surface is not heated since no hot air is forced out from the first to third hot air nondischarge portions 621 to 623.

The hot air forced out from the third hot air discharge portion 613 partly flows into the recessed portion 641 upon reversing after heating the third heating region 423 of the inner surface, so that the second nonheating region of the inner surface is prevented from being heated.

In heating the outer surface of the top forming portion 313, the first and second outer surface heating regions 451, 452 are heated by the first and second hot air discharge portions 711, 712.

The hot air forced out of the container inner surface heating nozzle 571 and the container outer surface heating nozzle 572 is liable to remain within the container W. When thus remaining, the hot air is liable to heat unnecessary portions. The hot air remaining in the container W is rapidly released from the container W through the recessed portion 641 as indicated by an arrow E in FIG. 14, so that there is no likelihood of hot air remaining or being confined in the container W.

The foam or froth B produce during filling will remain on the liquid surface L within the container. The froth B is especially heaped up in the central portion of the liquid surface L. If the froth B adheres to the bottom wall 585 of the inner surface heating nozzle 571 and is carried along the wall 585 to the location of orifices 731 by the hot air, there is the likelihood that orifices 731 will be clogged up. However, the presence of the recessed portion 641 eliminates the likelihood of the froth B adhering to the bottom wall 585.

What is claimed is:

1. A heating device for heat-sealing containers by heating an end forming portion of a tubular container having a rectangular to square cross section, the end forming portion having four generally quadrilateral first to fourth panels continuous with one another and each having a heating region to be heated on an inner surface thereof, the heating device having a hot air nozzle in the form of a bottomed tube and fittable into the container end forming portion for heating an inner surface of the container, the nozzle having four side walls continuous with one another and corresponding to the first to fourth panels respectively, at least one of the side walls being provided with a hot air discharge portion having orifices and to be opposed to the heating region of the corresponding panel and with a hot air nondischarge portion other than the discharge portion, the hot air nondischarge portion being at least partly provided with a hot air escape portion.

2. A heating device for heat-sealing containers according to claim 1 wherein the hot air discharge portion and the hot air nondischarge portion are divided into upper and lower portions by a boundary, and the hot air escape portion is provided over the entire area of the nondischarge portion.

3. A heating device for heat-sealing containers according to claim 2 wherein the boundary is substantially inverted V-shaped by extending upward from opposite ends of a lower edge of the side wall.

4. A heating device for heat-sealing containers by heating an end forming portion of a tubular container having a rectangular to square cross section, the end forming portion having four generally quadrilateral first to fourth panels continuous with one another and each having a heating region to be heated on an outer surface thereof, the heating device having a hot air nozzle to be fitted around the container end forming portion for heating an outer surface of the container, the nozzle having four side walls continuous with one another and corresponding to the first to fourth panels respectively, at least one of the side walls being provided with a hot air discharge portion having orifices and to be opposed to the heating region of the corresponding panel and with a hot air nondischarge portion other than the discharge portion, the hot air nondischarge portion being at least partly provided with a hot air escape portion.

5. A heating device for heat-sealing containers according to claim 4 wherein the hot air discharge portion and the hot air nondischarge portion are divided into upper and lower portions by a substantially horizontal straight boundary interconnecting lengthwise intermediate portions of opposite side edges of the side wall, and the hot air escape portion is provided over the entire area of the nondischarge portion.

6. A heating device for heat-sealing containers according to claim 4 wherein the heating region provided on the outer surface of at least one of the four panels is zero, and the side wall corresponding to said one panel is provided with the hot air nondischarge portion only, the hot air escape portion being provided over the entire area of the nondischarge portion.

7. A heating device for heat-sealing containers according to any one of claims 4 to 6 wherein the hot air nozzle is suspended from a mount plate, and a hot air vent clearance is formed between the mount plate and at least one peripheral portion of the hot air nozzle.

8. A heating device for heat-sealing containers by heating a top forming portion of a tubular container having a rectangular to square cross section, the top forming portion having four generally quadrilateral first to fourth top panels continuous with one another and divided by first to fourth scores into first to fourth roof panels and first to fourth seal panels respectively, each of the first and fourth seal panels having a heating region to be heated on an outer surface thereof, the heating device having a hot air nozzle in the form of a bottomed tube and fittable into the container top forming portion for heating an inner surface of the container, the nozzle having four side walls continuous with one another and corresponding to the first to fourth seal panels respectively, at least one of the side walls being provided with a hot air discharge portion having orifices and to be opposed to the heating region of the corresponding seal panel and with a hot air nondischarge portion other than the discharge portion, the hot air nondischarge portion being at least partly provided with a hot air escape portion.

9. A heating device for heat-sealing containers according to claim 8 wherein the nozzle has a bottom wall, and the hot air escape portion is a recessed portion extending from the side wall of the nozzle to the bottom wall.

10. A heating device for heat-sealing containers according to claim 9 wherein two hot air discharge portions are positioned respectively on opposite sides of one hot air nondischarge portion, and the hot air escape portion is provided over the entire area of the nondischarge portion.

11. A heating device for heat-sealing containers according to claim 8 wherein two hot air discharge portions are positioned respectively on opposite sides of one hot air nondischarge portion, and the hot air escape portion is provided over the entire area of the nondischarge portion.

12. A heating device for heat-sealing containers according to any one of claims 8 to 11 which has a hot air nozzle to be fitted around the container top forming portion for heating an outer surface of the container, the hot air nozzle for heating the container outer surface being suspended from a mount plate, a hot air vent clearance being formed between the mount plate and the hot air nozzle for heating the container outer surface.

* * * * *